(12) United States Patent
Donderici et al.

(10) Patent No.: US 10,612,306 B2
(45) Date of Patent: *Apr. 7, 2020

(54) OPTIMIZED PRODUCTION VIA GEOLOGICAL MAPPING

(71) Applicant: Halliburton Energy Services, Inc., Houston, TX (US)

(72) Inventors: Burkay Donderici, Pittsford, NY (US); Fady Adel Maurice Iskander, Fulshear, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/038,082

(22) Filed: Jul. 17, 2018

(65) Prior Publication Data

US 2018/0320447 A1    Nov. 8, 2018

Related U.S. Application Data

(63) Continuation of application No. 14/814,091, filed on Jul. 30, 2015, now Pat. No. 10,036,204.

(Continued)

(51) Int. Cl.
*E21B 7/06* (2006.01)
*G01V 3/20* (2006.01)
(Continued)

(52) U.S. Cl.
CPC ............ *E21B 7/06* (2013.01); *E21B 41/0092* (2013.01); *E21B 43/24* (2013.01); *E21B 43/30* (2013.01);
(Continued)

(58) Field of Classification Search
CPC ........ E21B 7/06; E21B 41/0092; E21B 43/24; E21B 43/30; E21B 43/305; E21B 44/005;
(Continued)

(56) References Cited

U.S. PATENT DOCUMENTS 5,589,775 A    12/1996    Kuckes
5,923,170 A    7/1999    Kuckes
(Continued)

FOREIGN PATENT DOCUMENTS

EP    1872156 A1    1/2008
WO    2010065161 A1    6/2010
(Continued)

OTHER PUBLICATIONS

GCC Application Serial No. 2015/29970; GCC Examination Report; dated Feb. 28, 2018.
(Continued)

*Primary Examiner* — Yong-Suk Ro
(74) *Attorney, Agent, or Firm* — Gilliam IP PLLC

(57) ABSTRACT

A method for optimizing production in a well. The method comprises: localizing low resistivity fluid deposits in a geological formation based on calculation of a difference between two electric current values, where each of the two electric current values correspond to different depths in the well. Production from the geological formation is optimized based on the localizing by adjustment of at least one of a drilling parameter or a production parameter.

30 Claims, 13 Drawing Sheets

Related U.S. Application Data

(60) Provisional application No. 62/062,451, filed on Oct. 10, 2014.

(51) Int. Cl.

| | | |
|---|---|---|
| *E21B 43/24* | (2006.01) | |
| *E21B 43/30* | (2006.01) | |
| *E21B 41/00* | (2006.01) | |
| *E21B 44/00* | (2006.01) | |
| *E21B 47/024* | (2006.01) | |
| *G01V 3/28* | (2006.01) | |
| *E21B 47/022* | (2012.01) | |

(52) U.S. Cl.
CPC .......... *E21B 43/305* (2013.01); *E21B 44/005* (2013.01); *E21B 47/024* (2013.01); *G01V 3/20* (2013.01); *G01V 3/28* (2013.01); *E21B 47/02216* (2013.01)

(58) Field of Classification Search
CPC ............ E21B 47/024; E21B 47/011; E21B 47/02216; E21B 44/00; G01V 3/20; G01V 3/28; G06F 19/00; G05B 19/02
See application file for complete search history.

(56) References Cited

U.S. PATENT DOCUMENTS

| | | | |
|---|---|---|---|
| 7,812,610 | B2 | 10/2010 | Clark et al. |
| 8,596,382 | B2 | 12/2013 | Clark et al. |
| 10,036,204 | B2 * | 7/2018 | Donderici ............ G01V 3/20 |
| 2004/0154831 | A1 | 8/2004 | Seydoux et al. |
| 2006/0170424 | A1 | 8/2006 | Kasevich |
| 2009/0288881 | A1 | 11/2009 | Mullins et al. |
| 2012/0067644 | A1 | 3/2012 | Goswami et al. |
| 2013/0169278 | A1 | 7/2013 | Bittar et al. |
| 2014/0089402 | A1 | 6/2014 | Donderici et al. |
| 2016/0102500 | A1 | 4/2016 | Donderici et al. |

FOREIGN PATENT DOCUMENTS

| | | |
|---|---|---|
| WO | 2014089402 A2 | 6/2014 |
| WO | 2016057103 A1 | 4/2016 |

OTHER PUBLICATIONS

Australian Application serial No. 2015328646, Examination Report No. 1, dated Oct. 12, 2017, 3 pages.
Russian Application Serial No. 2017109672; Decision on Granting; dated May 15, 2018, 4 pages.
Canadian Examiner's Letter Application Serial No. 2,960,689; dated Jan. 19, 2018, 5 pages.
Koolman, et al., "Electromagnetic Heating Method to Improve Steam Assisted Gravity Drainage", SPE-117481-MS, International Thermal Operations and Heavy Oil Symposium, Oct. 20-23, 2008, Calgary, Alberta, Canada, Jan. 1, 2008 00:00:00.0, 1-12.
Moini, et al., "Quantifying Heat Requirements for SAGD Start-up Phase: Steam Injection, Electrical Heating", SPE Journal of Canadian Petroleum Technology, 52(2), Mar. 1, 2013 00:00:00.0, 89-94.
Steingrimsson, et al., "Geothermal Well Logging: Geological Wireline Logs and Fracture Imaging", Short Course on Geothermal Drilling, Resource Development and Power Plants, Santa Tecla, El Salvador, Jan. 16-22, 2011, Jan. 1, 2011 00:00:00.0, 1-11.
GCC Application Serial No. 2015/29970; Second Examination Report; dated Jul. 12, 2018, 3 pages.
Canadian Application Serial No. 2,960,689; Second Examiner's Letter; dated Nov. 2, 2018, 6 pages.
Australian Application Serial No. 2018208726; First Exam Report; dated Jun. 19, 2019, 3 pages.
Indian Application Serial No. 201717008343; First Examination Report; dated Jul. 24, 2019, 6 pages.
International Application Serial No. PCT/US2015/042961, International Search Report, dated Oct. 19, 2015, 3 pages.
International Application Serial No. PCT/US2015/042961, International Written Opinion, dated Oct. 19, 2015, 9 pages.

* cited by examiner

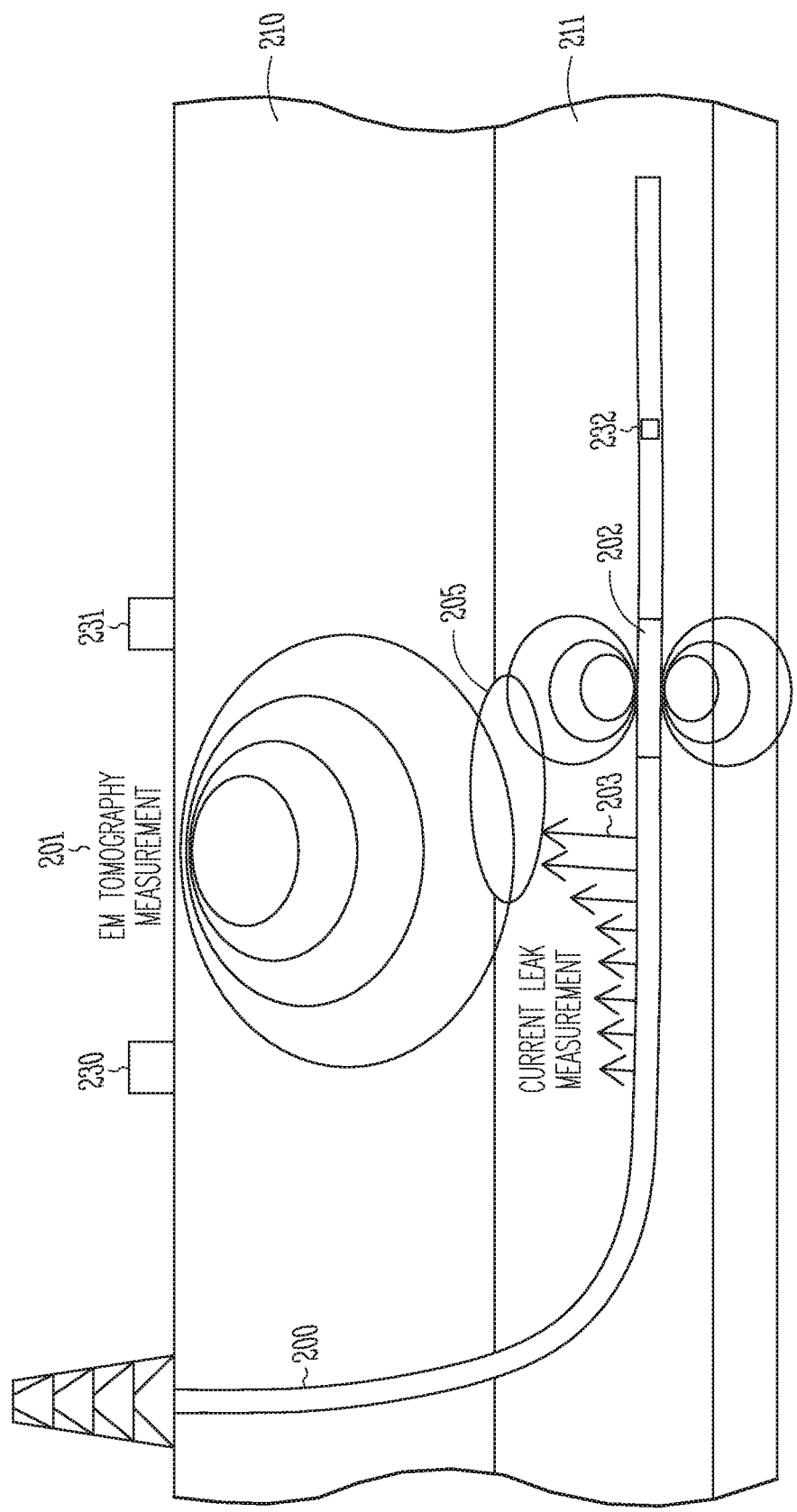

OPTIMIZED PRODUCTION VIA GEOLOGICAL MAPPING

BACKGROUND

The easy to access and produce hydrocarbon resources are being depleted leaving more difficult wells to access and produce. Meeting the world's growing demand for hydrocarbons resulted in the development of advanced recovery procedures, often referred to as complex recovery completions and production techniques. These methods may include Steam Assisted Gravity Drainage (SAGD), Thermal Assisted Gravity Drainage (TAGD), Toe to Heal Air Injection (THAI), Vaporized Hydrocarbon Solvent (VAPEX) production and Fire Flooding. These techniques address the mobility problem of the heavy oil wells by thermally and/or chemically altering the viscosity of the bitumen to allow for easy extraction. While each of the complex completion techniques offers a novel approach to heavy oil extraction, their success may rely on the difficult process of precise placement of wellbores with respect to near-by geological structures.

One difficult scenario includes local deposits that have the potential to cause steam to break through, resulting in a non-optimal steam chamber. In this case, as steam is injected from the injector well, it breaks through above or below the deposits and results in insufficient heating of bitumen and, thus, reduction in production.

In one solution, producer wells are placed using resistivity or gamma logs to detect formation layering from a distance. In this case, a distance to nearby layering is used to optimally place the producer well in the reservoir by geosteering the drilling. After the producer well is placed, the injector well is placed with respect to the producer well using ranging devices that can measure the relative distance and direction between the two wells.

Well-known commercial approaches for this technique are based on rotating magnets (e.g., U.S. Pat. No. 5,589,775) or magnetic guidance (U.S. Pat. No. 5,923,170) that utilize both wellbores for ranging. Most of these approaches, however, are undesirable in that they use two different crews (i.e., wireline and logging while drilling (LWD)), which is not cost effective. One prior magnetic approach is based on a single well system where both the transmitter and the receivers are downhole. This approach, however, is based on absolute magnetic field measurement for distance calculation (U.S. Pat. No. 7,812,610) that does not produce reliable results due to variations of the current on the target pipe.

Additionally, the prior art techniques typically place the injector well a fixed distance above the producer well. The selection of the fixed distance may be made heuristically without considering geological and petrophysical variations. This may result in placement of the injector well at non-optimal positions and reduction in volume of accessible hydrocarbons.

BRIEF DESCRIPTION OF THE DRAWINGS

FIG. 2 is a cross-sectional diagram showing a geological formation having a fluid deposit to be mapped using various embodiments of a localizing method from a producer well, according to various examples.

DETAILED DESCRIPTION

The embodiments described herein include two steps: localization and measurement of low resistivity fluid deposits and optimization of production with the given geology information. The localization and measurement may be performed through downhole or surface resistivity measurements owing to the low resistivity nature of the deposits. The localization and measurement step may also be referred to as mapping of the deposits in a geological formation.

The optimization may be performed using multiple methods. For example, the drill string (e.g., drill bit) of the injector or producer wells may be geosteered away from the deposits in a three dimensional fashion (e.g., laterally and/or vertically). In another optimization embodiment, the slots and/or seams of the well casing may be adjusted based on the near-by deposits. Both types of optimization may be assisted by steam chamber or geo-steering models that incorporate the local geology and drilling performance related information.

The fluid deposits referred to herein include a low resistivity fluid deposit. Low resistivity fluid deposits may be characterized by measuring how strongly the fluid opposes the flow of electric current. A low resistivity fluid deposit may be defined as any fluid having an electrical resistance of less than 300 Ohms which includes most hydrocarbons. The low resistivity fluid deposit may be referred to as simply a fluid, a deposit, or a fluid deposit and is assumed herein to be low-resistivity.

Figure 1:
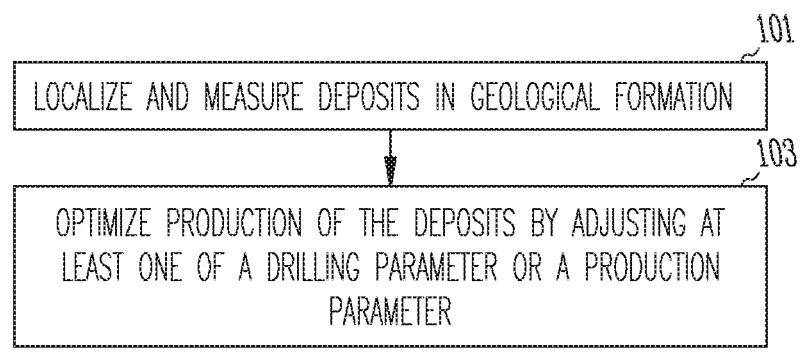
FIG. 1 is a flowchart showing a method for optimizing production of fluid deposits using geological mapping, according to various examples.

FIG. 1 is a flowchart showing a method for optimizing production of fluid deposits using geological mapping, according to various examples. In box 101, a method for localizing and measuring the deposits in a geological formation is initially used. This step maps the size and location of the deposits. Various embodiments for localizing and measuring the deposits are illustrated in FIGS. 2-7 and discussed subsequently.

Once the deposits are mapped, production of the deposits may then be optimized in box 103 by adjusting at least one of a drilling parameter or a production parameter. Various embodiments for optimizing production of the deposits are illustrated in FIGS. 8-13 and discussed subsequently.

FIG. 2 is a cross-sectional diagram showing a geological formation having a fluid deposit to be mapped using various embodiments of a localizing method from a producer well, according to various examples. It is noted here that the variations that are included in this illustration are not necessarily used together and they are shown together mainly for the sake of contrasting them with respect to each other. As described previously, detailed geological models of fluid deposits are not typically available a-priori. Seismic surveys do not have a high enough resolution and are not as sensitive to types of deposits that may cause a steam break-through. The delineations that are logged with wireline and cored wells may be available but this data is not contiguous and may not be used to interpolate in between wells. The localizing and measuring embodiments disclosed in FIG. 2 provide greater accuracy for later optimization of production.

FIG. 2 shows a well 200 (e.g., producer or injector) drilled through a geological formation 210 and a deposit layer 211. The deposit layer 211 may include a low resistivity fluid deposit 205.

An EM tomography measurement embodiment 201 is shown. This embodiment may include both a transmitter 230 and receiver 231 on the surface, the transmitter 230 on the surface and the receiver 232 in the well 200, the transmitter 232 in the well and the receiver 231 on the surface, or the transmitter in one wellbore while the receiver is in another wellbore.

FIG. 2 further shows an LWD deep resistivity reading sensor tool 202 in the drill string. The tool incorporates a multi-frequency, deep-reading, azimuthal (directional) resistivity sensor that may incorporate tilted receiver coils. The LWD deep resistivity sensor tool 202 may provide measurements of approximately 20 feet from the well 200. The LWD tool 202 may also be used in an LWD ultra-deep resistivity reading embodiment (e.g., >approximately 20 feet).

A current leakage measurement 203 embodiment is illustrated in relation to the well 200. As discussed subsequently, this embodiment measures the current leakage on one of the pipes to map out the location and shape of the deposits 205.

Figure 3:
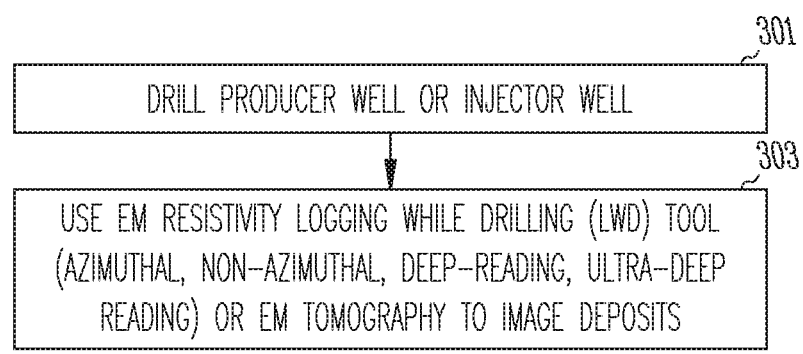
FIG. 3 is a flowchart showing an embodiment of the method for localization using electromagnetic (EM) resistivity measurements, according to various examples.

FIG. 3 is a flowchart showing an embodiment of the method for localization using electromagnetic (EM) tomography or resistivity measurements, according to various examples. This embodiment may use EM tomography transmitter/receivers or an EM resistivity LWD tool (e.g., azimuthal, non-azimuthal, deep reading, or ultra-deep reading) to perform EM tomography or EM resistivity measurements.

In block 301, the producer well or injector well is drilled 301 as shown in FIG. 2. In block 303, the EM tomography transmitters/receivers or EM resistivity LWD tool may then be used.

EM tomography measurement may be performed from surface to wellbore, wellbore to another wellbore, or surface to surface. It may be performed as a single-shot measurement or a time-lapse measurement. EM tomography measurements may employ an array of transmitting antennas and receiving antennas which may be of magnetic dipole, electric dipole or electric monopole type. These transmitters and receivers may be towed on trucks, ships or sub-sea vehicles depending on the type of operating environment.

In EM tomography, a single frequency, multi-frequency or pulsed electromagnetic signal is transmitted from the transmitter into the subterranean formations. Diffused and scattered signals, resulting from the transmitted signal, are received from the formation by the receivers. The received electric and/or magnetic fields or voltages are partly indicative of the characteristics of the downhole formations, specifically the resistivity of the layers.

The EM tomography measurements may be used to calculate the position of deposits at various depths (e.g., 0-6000 feet). EM tomography may be used if deposits are relatively large in volume and conductivity contrast. Localization of deposits with the EM tomography method may begin with an initial estimate of the underlying formation layers. This enables the system to resolve the layers easily and focus on the deposits.

LWD azimuthal resistivity tools may also be used to map out the deposits. LWD azimuthal resistivity tools may make multiple measurements of resistivity at different azimuthal orientations relative to the wellbore as the tool rotates with the natural rotation of the drilling. The deep reading tool may be used in measuring deposits having a shallower nature (e.g., up to 20 feet range relative to wellbore) to enable operators to map out the resistivity of the reservoir section that is local to the resistivity tool position.

In one embodiment, an azimuthal resistivity tool may be used. However, another embodiment may use a non-azimuthal tool if a relative direction of the observed deposit is not needed.

The LWD tool may be placed in the drill string of the producer well and/or the injector well. The resistivity logging data may then be collected at one or more depths as the drilling continues. Deposits may be identified from unexpected deviations of the tool responses as the horizontal drilling commences. They can also be identified from distance to bed boundary inversions that can be conducted at different points. Ultra-deep reading tools may be used to map deposits up to 100 feet away from the borehole.

Figure 4:
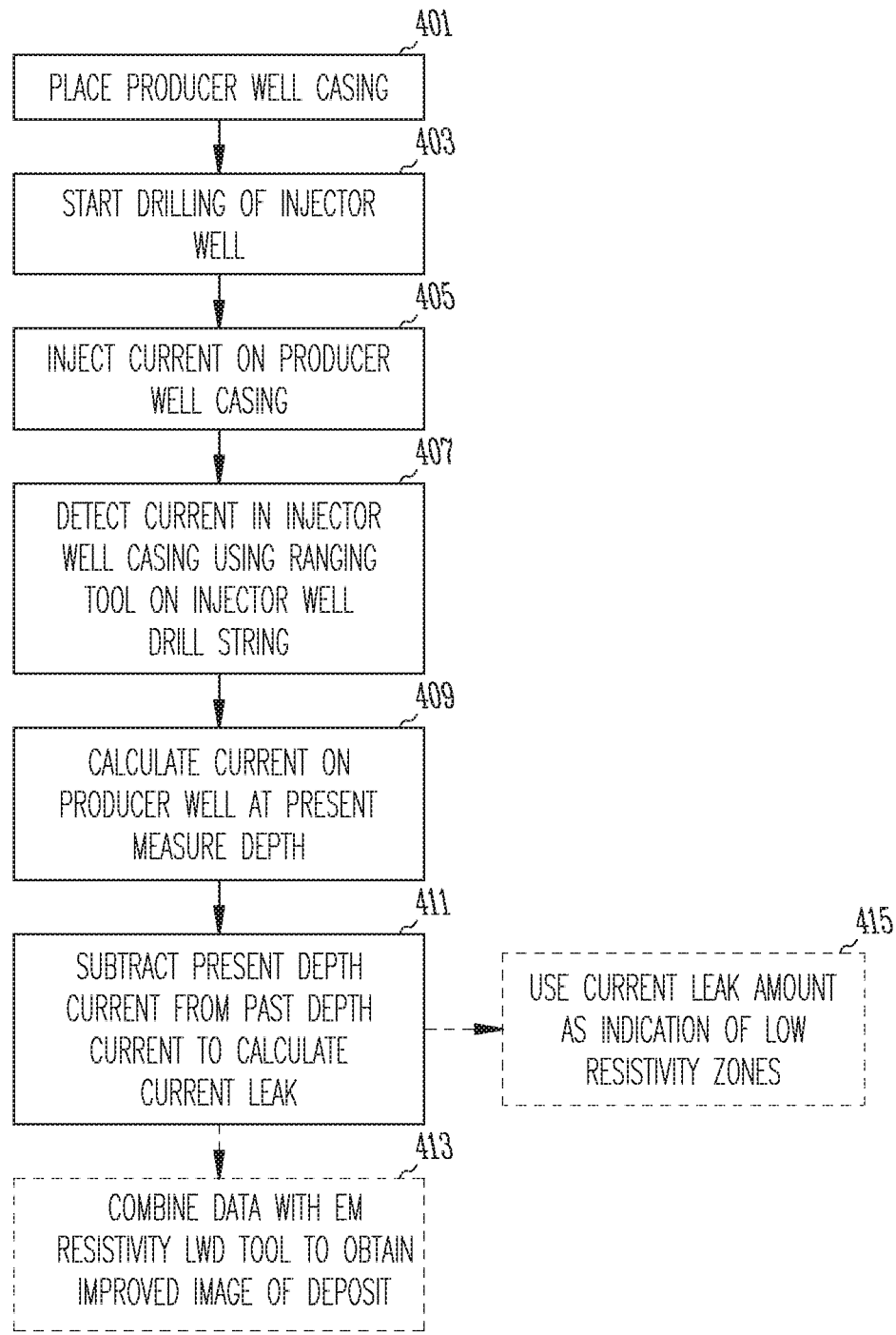
FIG. 4 is a flowchart showing an embodiment of the method for localization using current leakage measurement, according to various examples.

FIG. 4 is a flowchart showing an embodiment of the method for localization using current leakage measurement, according to various examples. This embodiment may be used from one of the casings (e.g., producer or injector) to map out the relative location and shape of the deposits with respect to the wellbore used.

In the interest of clarity, the following method is described with respect to the current being injected on the producer well casing. However, the terms "producer" and "injector" wells may be swapped and the method would still operate as described.

In block 401, casing is placed in the producer well. In block 403, drilling of the injector well is begun. A current may then be injected on the producer well casing, in block 405, from an electrode that is connected to the wellhead. As the current moves down in the casing in the wellbore, it leaks out to the geological formation. The leakage at each depth is proportional to the local resistivity at that region and near-by zones. Any near-by low resistivity deposit causes the current leak to increase. The leakage difference along the casing may used as an indication of the presence of a near-by deposit.

In block 407, the current may be detected in the injector well casing using a ranging tool on an injector well drill string. The current may be calculated on the producer well at the present measure depth in block 409. This calculated current is subtracted from a past depth current measurement in order to calculate the current leakage in block 411.

Two different operations 413, 415 may be performed as a result of determining the current leakage. In one embodiment (i.e., block 413), the calculated current leakage may be combined with EM resistivity LWD tool data to obtain an improved image of the deposit. In another embodiment (i.e., block 415), the calculated current leakage indicates a zone of low resistivity. Such a zone may be indicative of a low resistivity fluid deposit.

Effect of resistivity variations may be removed from the calculations by using well planner software that can simulate an expected current leak given a well path and geology information but without the deposits. Since the producer well is typically placed at a fixed distance with respect to near-by formation layers (through practice of geosteering), changes in the leakage correlate well with the low resistivity deposits.

The current leakage may be measured using any one of a plurality of embodiments that use a measurement of the current at each depth as the first step. One embodiment may employ current injection on the producer, and LWD magnetic field measurements during the drilling of the injector. In this case, the magnetic field measurements are directly proportional to the current on the producer at the section that is closest to the magnetic field measurement tool in the injector. This may be illustrated in equation (1) as:

$$\overline{H} = \frac{1}{2\pi r}\hat{\phi} \quad (1)$$

where H is the magnetic field vector, I is the current on the pipe, r is the shortest distance between the receivers and the pipe and φ is a vector that is perpendicular to both z axis of the receiver and the shortest vector that connects the pipe to the receivers.

The relationship of equation (1) assumes constant casing current along the casing. However, this embodiment may be extended to any current distribution by using an appropriate electromagnetic model. This model and configuration may be employed by the ranging tools to place the injector well at fixed distance and direction with respect to the producer well. As a result, a ranging tool may be used for the dual purpose of well placement and also mapping of the deposits. In this configuration, gradient measurements from the ranging tool can be used to measure the distance and absolute magnetic field measurement so that the measured distance can be used to calculate the current.

Figure 5:
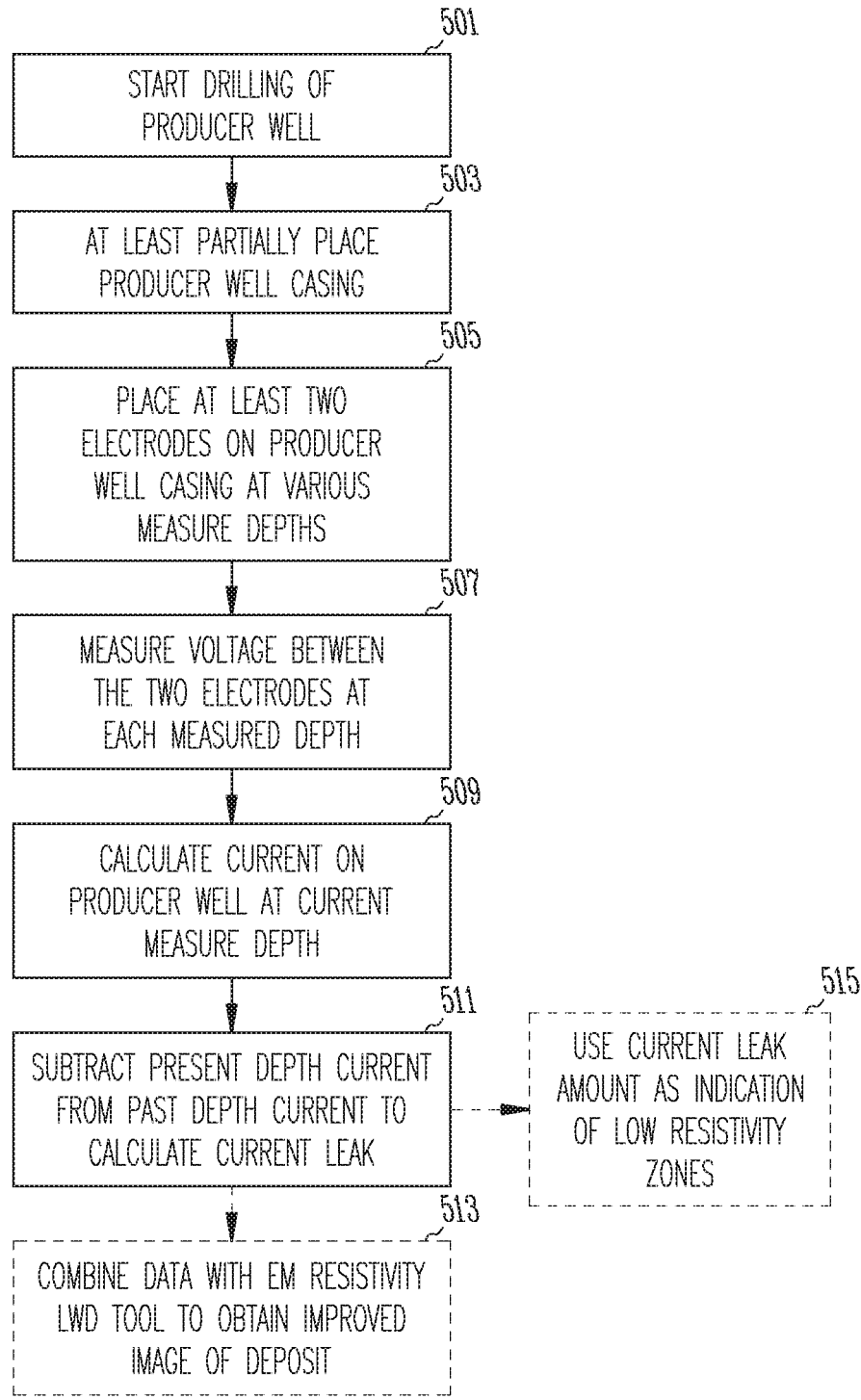
FIG. 5 is a flowchart showing another embodiment of the method for localization using current leakage measurement, according to various examples.

FIG. 5 is a flowchart showing another embodiment of the method for localization using current leakage measurement, according to various examples. In this embodiment, the current is injected in the producer and/or the injector and the electrodes are placed in the well where current is injected.

In block 501, drilling of the producer well is started and, in block 503, well casing is placed in at least a portion of the wellbore. At least two injection electrodes may be placed at various measurement depths of the producer casing, in block 505. The electrodes are axially separated by a distance along the casing that is fixed mechanically and both electrodes are kept in touch with the casing.

In block 507, the voltage between two measure electrodes is measured at each depth. These measure electrodes may be chosen individually the same with or different to the injection electrodes. The voltage between the measure electrodes is directly proportional to the current on the pipe between the electrodes, and it can be used in the estimation. This is based on ohm's law:

$$I = \frac{V}{R} \quad (2)$$

where V is the voltage between the electrodes, R is the resistance between the measure electrodes and I is the calculated current. In block 509, the current I may be calculated on the producer well at each measured depth.

Resistance R can be calculated from well plan or it can be measured by injecting a known current between the injection electrodes and measuring the voltage between the measure electrodes. If deposits are detected through the monitoring of variations in the current leak, the accuracy of the R parameter is not as important since it is only a multiplication factor.

In block 511, the current calculated at the present depth is subtracted from a past current that was calculated at the past depth to determine the current leakage between the present and past depths. This calculated leakage may be used in two ways. In block 513, the calculated leakage is combined with an EM resistivity LWD tool data to obtain an improved image of the deposit. In another embodiment (block 515), the current leakage may be used as an indication of a low resistivity zone.

Figure 6:
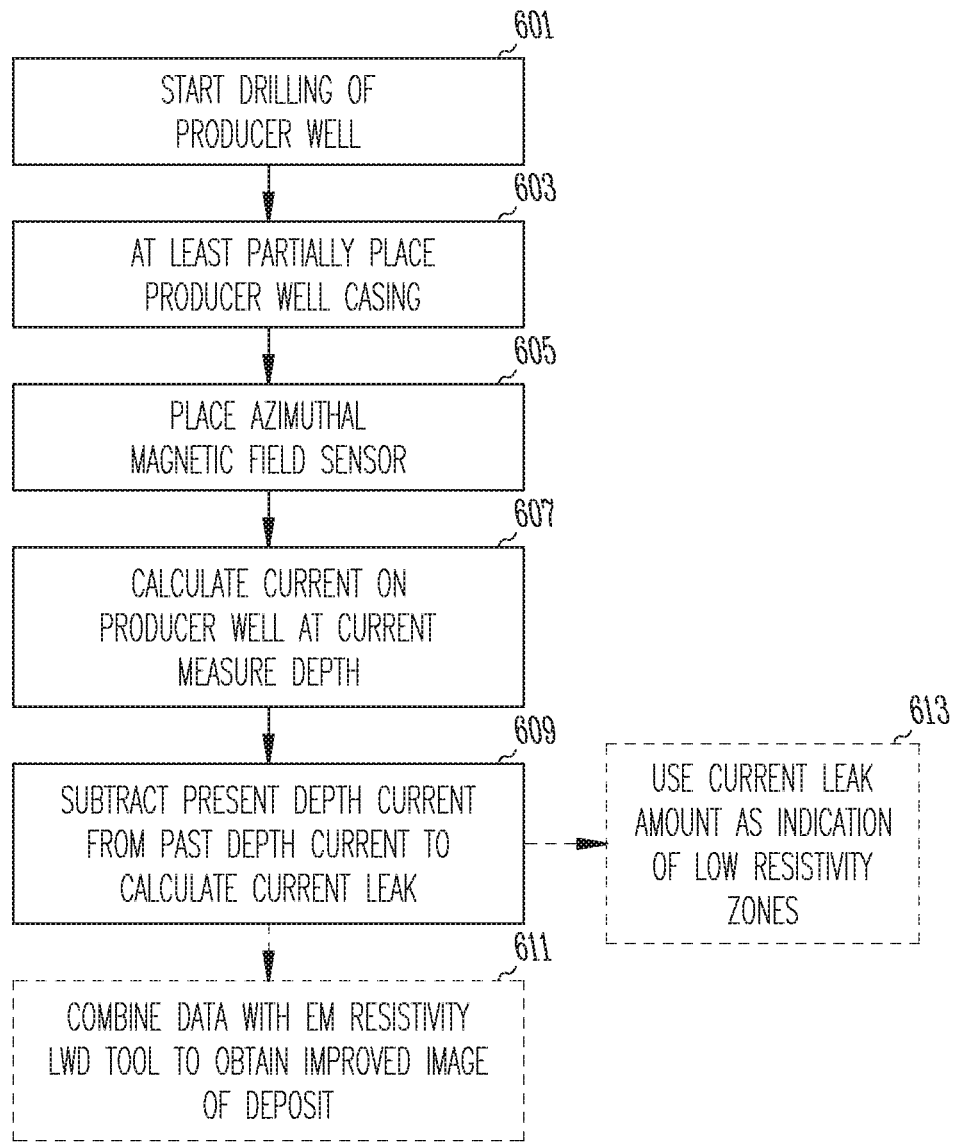
FIG. 6 is a flowchart showing another embodiment of the method for localization using current leakage measurement, according to various examples.

FIG. 6 is a flowchart showing another embodiment of the method for localization using current leakage measurement, according to various examples. This embodiment uses an azimuthal magnetic field from a permanent magnet sensor placed outside of the wellbore during construction.

In block 601, drilling of the producer well is started and, in block 603, well casing is placed in at least a portion of the wellbore. The azimuthal magnetic sensor is then placed outside of the casing in block 605. The magnetic field measurements are directly proportional to the current at the section of the pipe that is closest to the magnetic field sensor. Using equation (1), this embodiment solves for the unknown current using the measured magnetic field and distance from the sensor to the center of the casing.

In block 607, the current may be calculated on the producer well at each measured depth. In block 609, the current calculated at the present depth is subtracted from a past current that was calculated at the past depth to determine the current leakage between the present and past depths. This calculated leakage may be used in two ways. In block 611, the calculated leakage is combined with an EM resistivity LWD tool data to obtain an improved image of the deposit. In another embodiment (block 613), the current leakage may be used as an indication of a low resistivity zone.

Figure 7:
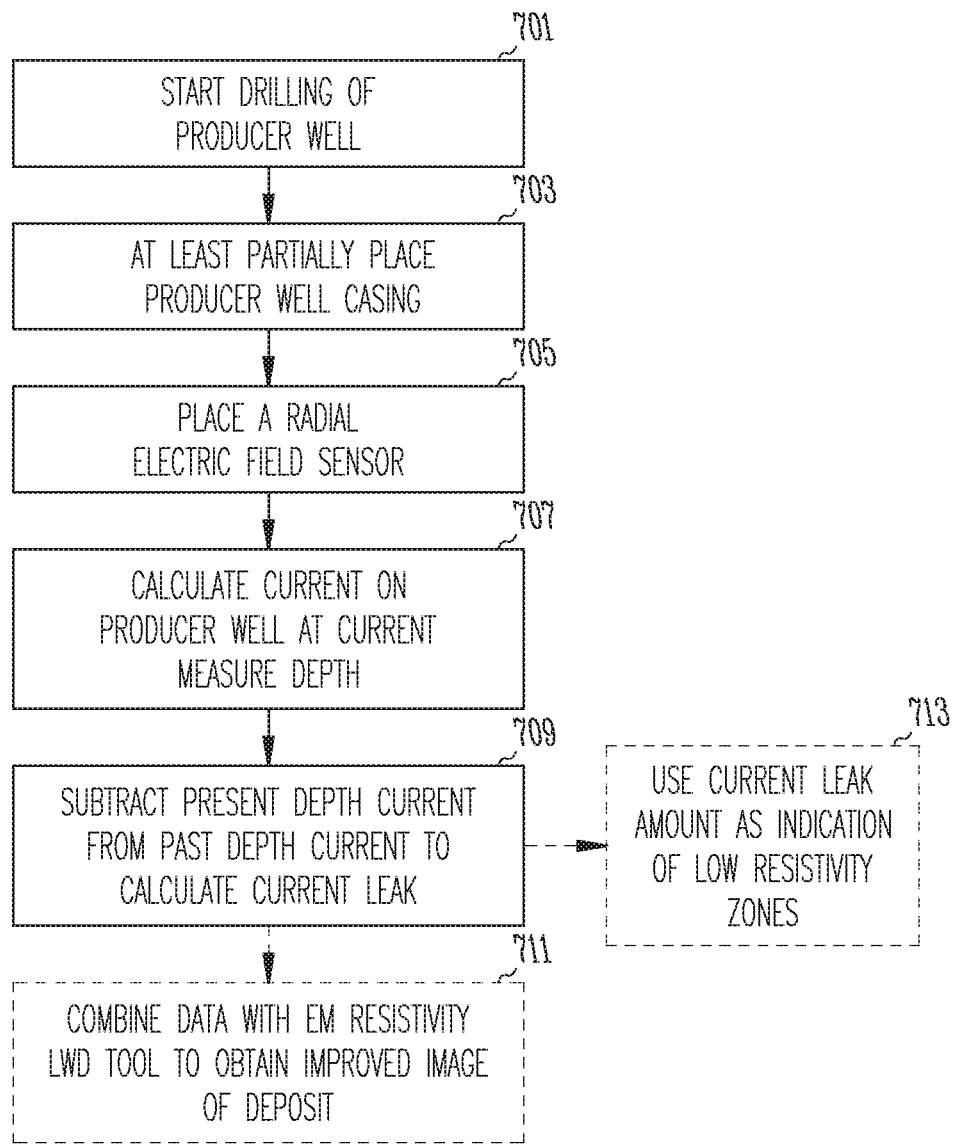
FIG. 7 is a flowchart showing another embodiment of the method for localization using current leakage measurement, according to various examples.

FIG. 7 is a flowchart showing another embodiment of the method for localization using current leakage measurement, according to various examples. This embodiment uses a radial electric field sensor In block 701, drilling of the producer well is started and, in block 703, well casing is placed in at least a portion of the wellbore. The radial electric field sensor is then placed outside of the casing in block 705. The radial electric field is directly proportional to current leakage and can provide a direct estimation of the location of a deposit.

In block 707, the current may be calculated on the producer well at each measured depth. In block 709, the current calculated at the present depth is subtracted from a past current that was calculated at the past depth to determine the current leakage between the past and present depths. This calculated leakage may be used in two ways. In block 711, the calculated leakage is combined with an EM resistivity LWD tool data to obtain an improved image of the deposit. In another embodiment (block 713), the current leakage may be used as an indication of a low resistivity zone.

In the embodiments of FIGS. 4-6, the leakage current between two points on the casing may be calculated through a simple subtraction of two currents along the well at those two points. In practice, if the points are chosen to too close, accuracy of the current leakage estimate may not be as accurate as more distant points since only a very small current is being probed. If the points are chosen too far, the resolution of the leakage measurement may become too low (which is in the order of the distance between the two electrodes). As a result, there is an optimal distance when both criteria are met. The optimal distance may vary with the resistivity of the formation and deposits, but it may be in a range between 1 foot and 50 feet.

The low resistivity fluid deposits may also be located through acoustic logging tools or borehole seismic methods through reflections or radial profiling applications. If deposits intersect the wellbore, a borehole imaging or coring method may be employed to collect more diverse data about the deposits.

Figure 8:
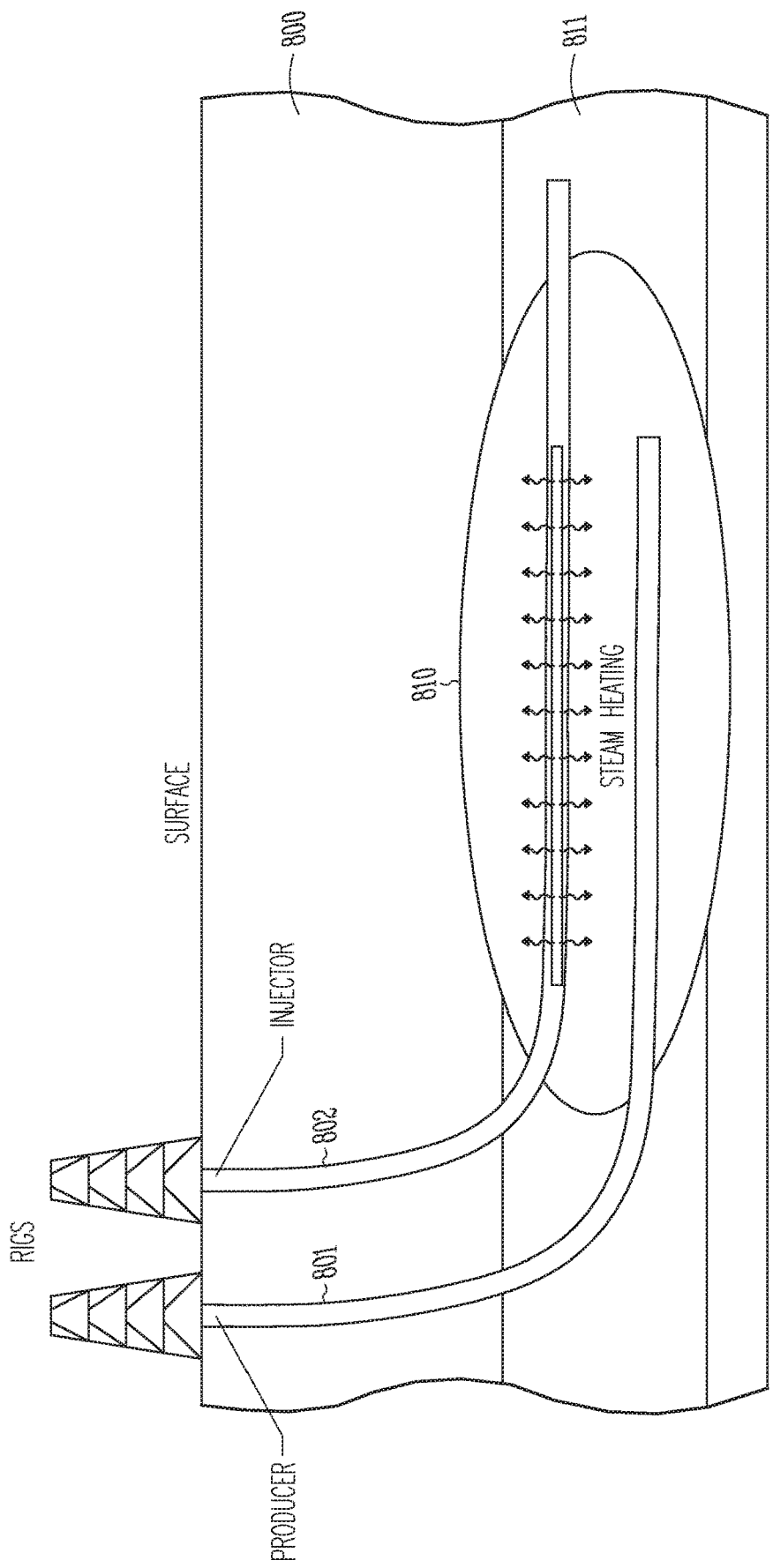
FIG. 8 is a cross-sectional diagram showing a geological formation with an embodiment of an SAGD steam chamber, according to various examples.

FIG. 8 is a cross-sectional diagram showing a geological formation with an embodiment of an SAGD steam chamber, according to various examples. The SAGD method may be used in combination with the various optimization embodiments discussed subsequently with reference to FIGS. 9-13. The SAGD method is shown for purposes of illustration only as other production methods may be used.

In this embodiment, the producer well 801 and injector well 802 are drilled through the geological formation 800 and into a deposit layer 811. Steam is then injected from the injector well 802. The steam forms a steam chamber 810 around the producer well 801.

The steam of the steam chamber 810 decreases the viscosity of any hydrocarbons in the deposit layer 811. This may increase the mobility of the hydrocarbons.

In another embodiment, heat may be applied through resistive means located in the injector well 802. This heat may also form the steam chamber 810 from any adjacent water. As the steam chamber 810 expands, the two wells 801, 802 are connected hydro-dynamically. The steam distribution around the wells 801, 802 is typically not uniform and may vary based on the geological and petrophysical properties of the rocks.

Figure 9:
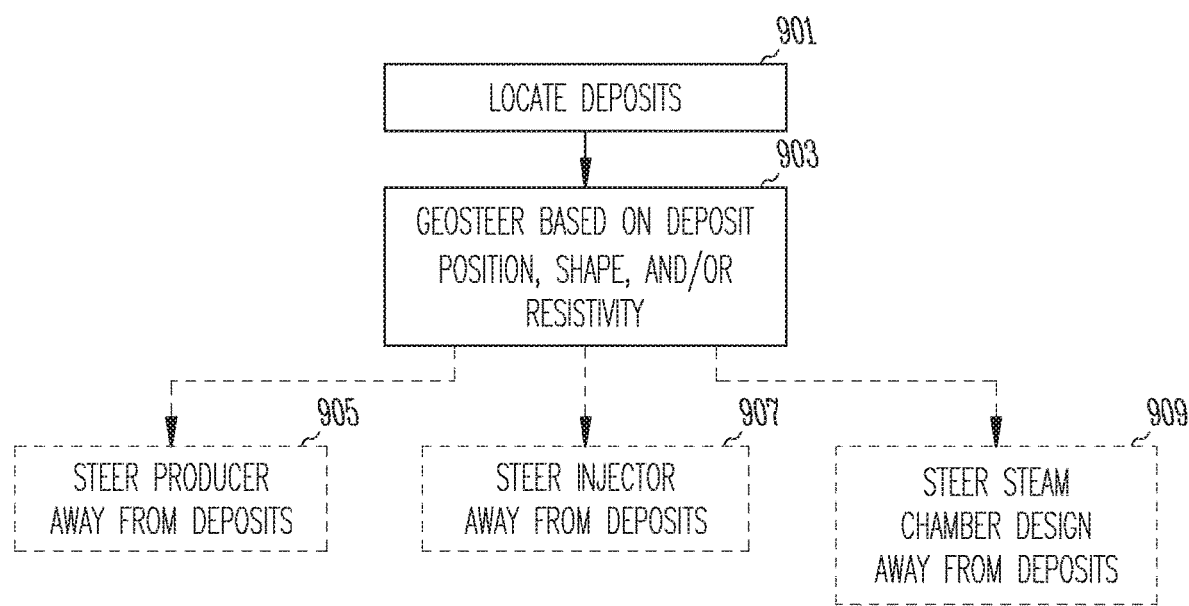
FIG. 9 is a flowchart showing an embodiment of a method for optimizing production of a fluid deposit, according to various examples.
Figure 10:
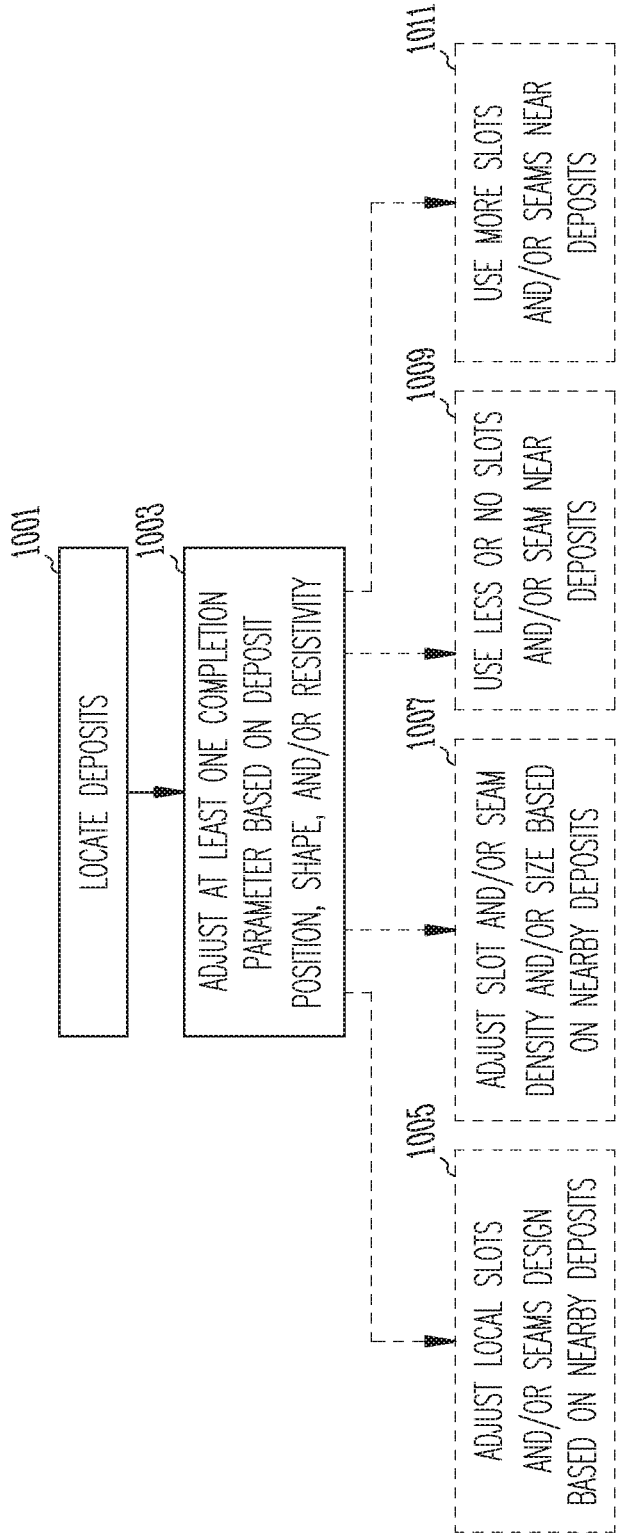
FIG. 10 is a flowchart showing another embodiment of the method for optimizing production of the fluid deposit, according to various examples.
Figure 11:
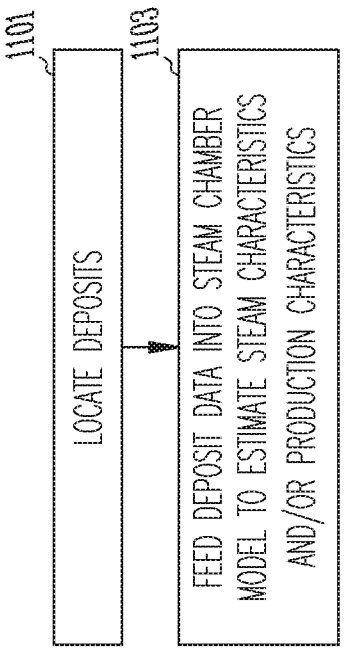
FIG. 11 is a flowchart showing another embodiment of the method for optimizing production of the fluid deposit, according to various examples.

Embodiments of the production optimization method are shown in FIGS. 9-11. These embodiments use geosteering, completion parameter optimization, or steam characteristics estimation. The embodiments are applied after localization of the deposits using one of the localization embodiments described previously.

Figure 12:
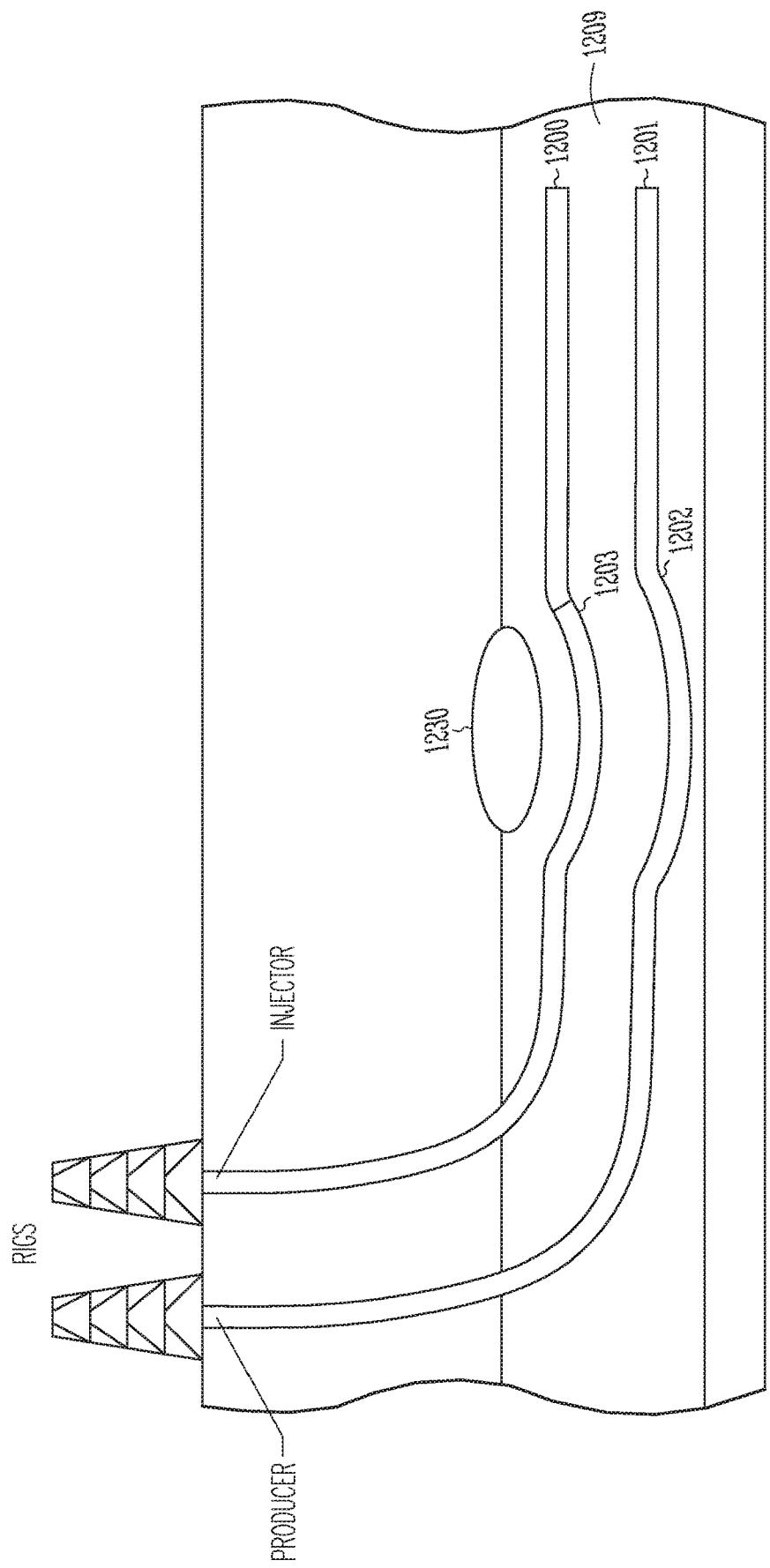
FIG. 12 is a cross-sectional view of a geological formation in which a geosteering embodiment of the optimization method is used around a deposit, according to various examples.

FIG. 9 is a flowchart showing an embodiment of a method for optimizing production of a fluid deposit, according to various examples. This embodiment uses geosteering as illustrated in FIG. 12.

The deposits are located and measured in block 901. Embodiments for performing this step have been discussed previously.

In block 903, the drilling of the producer or injector wells are geosteered based on deposit position, shape, and/or resistivity as previously described. The geosteering may be performed in one or more of the steps in blocks 905, 907, 909. For example, in block 905, the drilling of the producer well is geosteered away from the deposits. In block 907, the drilling of the injector well is geosteered away from the deposits. In block 909, the steam chamber design is geosteered away from the deposits.

FIG. 10 is a flowchart showing another embodiment of the method for optimizing production of the fluid deposit. This embodiment adjusts one or more completion parameters.

After the deposits are located and measured in block 1001, one or more of the completion parameters may be adjusted based on the deposit relative position, shape, and/or resistivity, as seen in block 1003.

Examples of the completion parameters may include adjusting local slots and/or seams of the casing based on nearby deposits, as seen in block 1005. Another example, in block 1007, includes adjusting the slot and/or seam density and/or size based on nearby deposits. In yet another example, in block 1009, fewer or no slots and/or seams may be used near deposits. In another example, in block 1011, more slots and/or seams may be used near deposits.

FIG. 11 is a flowchart showing another embodiment of the method for optimizing production of the fluid deposit, according to various examples. This embodiment uses a steam chamber model to estimate steam characteristics of the deposit.

In block 1101, the deposits are located 1101. In block 1103, the deposit data from the localizing operation is fed into a steam chamber model to estimate the deposit's steam characteristics and/or production characteristics.

FIG. 12 is a cross-sectional view of a geological formation in which a geosteering embodiment of the optimization method is used around a deposit, according to various examples. In this embodiment, the producer and injector wells 1200, 1201 are steered 1202, 1203 away from the low resistivity deposit 1230 but still within the high production zones in the reservoir 1209.

The geosteering may be accomplished by adjusting the vertical or horizontal placement of the wells 1200, 1201. The freedom of optimization in the vertical direction may be limited due to a limited size of the reservoir in the vertical direction. Producer and injector well 1200, 1201 placement may be optimized individually. Alternatively, the wells 1200, 1201 may be optimized jointly through the use of a steam chamber model that can produce an estimate of the production amount based on the placement of the wells 1200, 1201 with respect to near-by formation layers and deposits. The ideal positioning that optimizes the production is planned. Geosteering and operational limitations (e.g., maximum dogleg) may also be applied as a constraint in the optimization.

The optimization of production and localization of deposits can take place simultaneously. For example, as a well is drilled, an LWD tool may provide data that can localize the deposits. This information may then be used in real time to determine the ideal well path that is executed through geosteering. In the new well path, LWD tools collect new data and this process may be repeated. In this embodiment, this optimization may lead to different distances between the producer well and the injector well as a function of the presence of nearby deposits.

Figure 13:
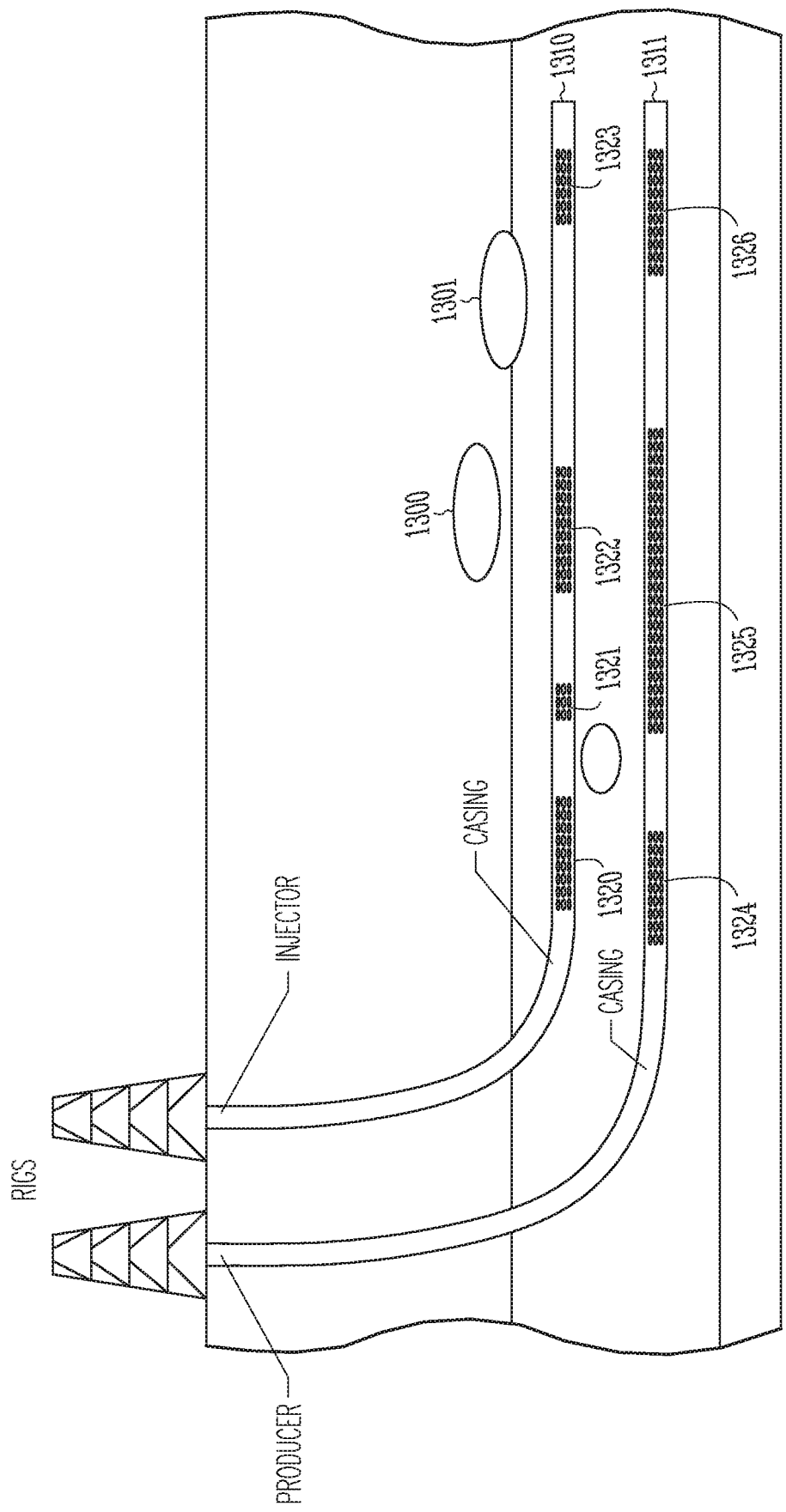
FIG. 13 is a cross-sectional view of a geological formation in which various casing embodiments of the optimization method are used near a deposit, according to various examples.

FIG. 13 is a cross-sectional view of a geological formation in which various casing embodiments of the optimization method are used near a deposit, according to various examples. This embodiment may use the density and/or distribution of the slots and/or seams of the casing to accommodate the localized deposits.

FIG. 13 shows producer and injector wells 1310, 1311 that each have casings/liners. The casings include varying densities of slots and/or seams 1320-1326 depending on the locations of the deposits 1300, 1301. For example, fewer or no slots and/or seams may be placed in areas with nearby deposits so that steam can be focused on the areas where production can be increased. An opposite strategy may also be used to use more (or wider) slots and seams in areas with deposits to compensate for the loss of steam in the desired volume. Determination of which strategy to use can be made based on a steam chamber hydro-dynamic and petrophysical model.

Figure 14:
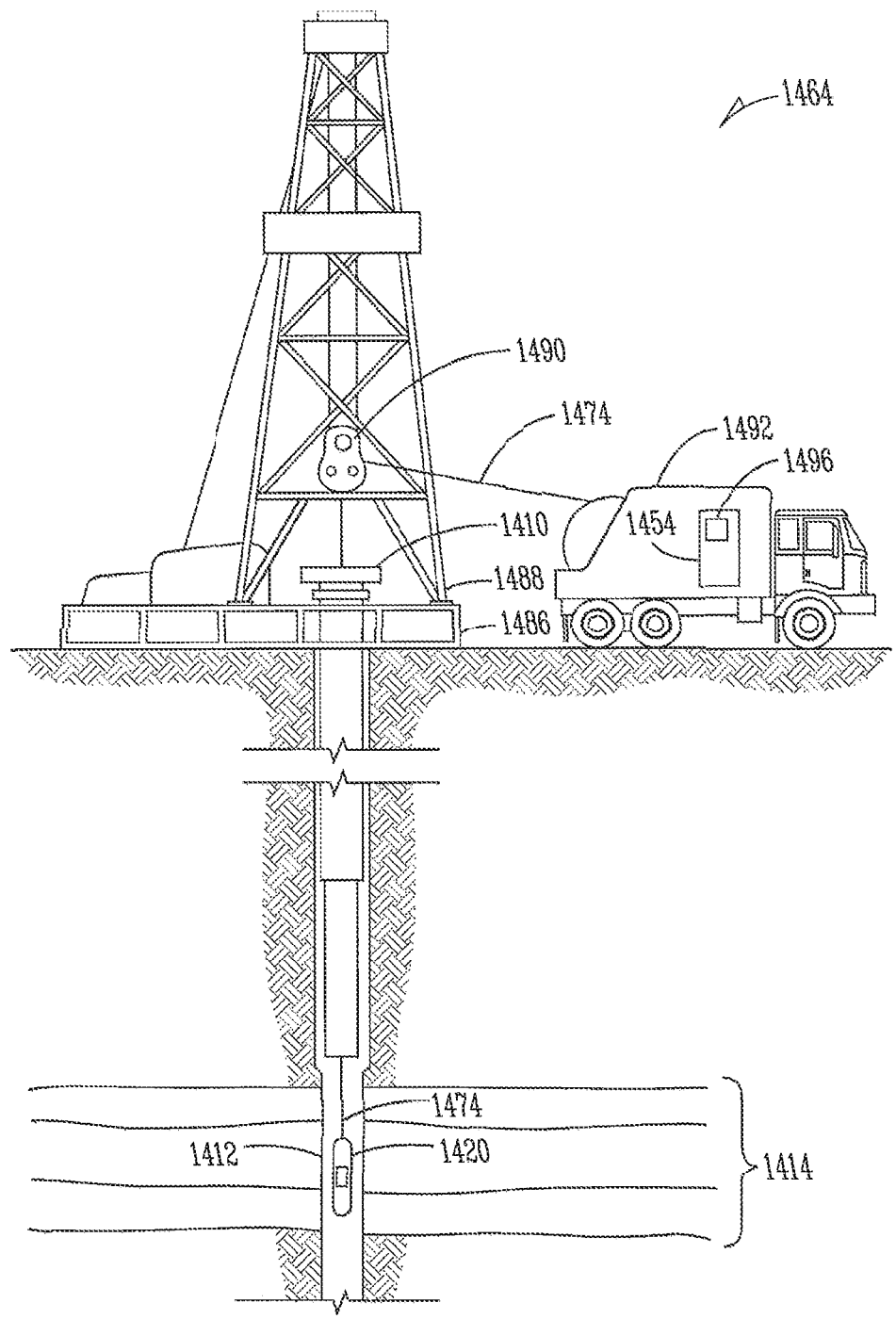
FIG. 14 is a diagram of a wireline system embodiment, according to various examples.
Figure 15:
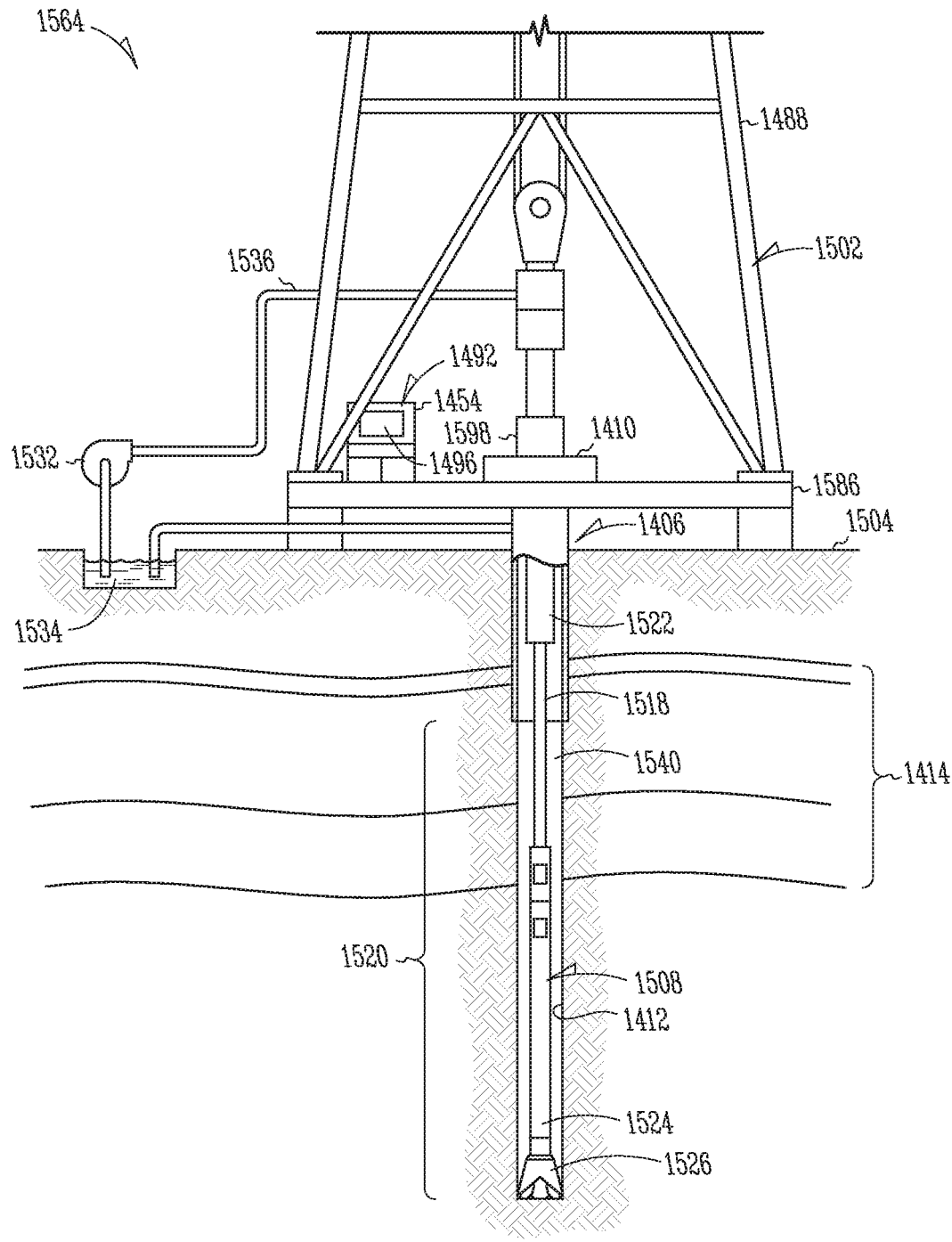
FIG. 15 is a diagram of a drilling rig system embodiment, according to various examples.

FIG. 14 is a diagram showing a wireline system 1464 and FIG. 15 is a diagram showing a drilling rig system 1564, according to various examples. The systems 1464, 1564 may thus comprise portions of a wireline logging tool body 1420 as part of a wireline logging operation or of a down hole tool 1524, including the EM tomography or LWD EM resistivity tools described previously, as part of a down hole drilling operation.

FIG. 14 illustrates a well that may be used as either an injector well or a producer well. In this case, a drilling platform 1486 is equipped with a derrick 1488 that supports a hoist 1490.

Drilling oil and gas wells is commonly carried out using a string of drill pipes connected together so as to form a drillstring that is lowered through a rotary table 1410 into a wellbore or borehole 1412. Here it is assumed that the drillstring has been temporarily removed from the borehole 1412 to allow a wireline logging tool body 1420 to be lowered by wireline or logging cable 1474 (e.g., slickline cable) into the borehole 1412. Typically, the wireline logging tool body 1420 is lowered to the bottom of the region of interest and subsequently pulled upward at a substantially constant speed.

During the upward trip, at a series of depths various instruments may be used to perform measurements on the subsurface geological formations 1414 adjacent to the borehole 1412 (and the tool body 1420). The wireline data may be communicated to a surface logging facility 1492 for processing, analysis, and/or storage. The logging facility 1492 may be provided with electronic equipment for various types of signal processing. Similar formation evaluation data may be gathered and analyzed during drilling operations (e.g., during LWD/MWD operations, and by extension, sampling while drilling). The data may be used for localizing and measuring the deposits as previously described.

In some embodiments, the tool body 1420 is suspended in the wellbore by a wireline cable 1474 that connects the tool to a surface control unit (e.g., comprising a workstation 1454). The tool may be deployed in the borehole 1412 on coiled tubing, jointed drill pipe, hard wired drill pipe, or any other suitable deployment technique.

Referring to FIG. 15, it can be seen how a system 1564 may also form a portion of a drilling rig 1502 located at the surface 1504 of a well 1506. The drilling rig 1502 may provide support for a drillstring 1508. The drillstring 1508 may operate to penetrate the rotary table 1410 for drilling the borehole 1412 through the subsurface formations 1414. The drillstring 1508 may include a drill pipe 1518 and a bottom hole assembly 1520, perhaps located at the lower portion of the drill pipe 1518.

The bottom hole assembly 1520 may include drill collars 1522, a down hole tool 1524, and a drill bit 1526. The drill bit 1526 may operate to create the borehole 1412 by penetrating the surface 1504 and the subsurface formations 1414. The down hole tool 1524 may comprise any of a number of different types of tools including MWD tools, LWD tools, and others.

During drilling operations, the drillstring 1508 (perhaps including the drill pipe 1518 and the bottom hole assembly 1520) may be rotated by the rotary table 1410. Although not shown, in addition to, or alternatively, the bottom hole assembly 1520 may also be rotated by a motor (e.g., a mud motor) that is located down hole. The drill collars 1522 may be used to add weight to the drill bit 1526. The drill collars 1522 may also operate to stiffen the bottom hole assembly 1520, allowing the bottom hole assembly 1520 to transfer the added weight to the drill bit 1526, and in turn, to assist the drill bit 1526 in penetrating the surface 1504 and subsurface formations 1414.

During drilling operations, a mud pump 1532 may pump drilling fluid (sometimes known by those of ordinary skill in the art as "drilling mud") from a mud pit 1534 through a hose 1536 into the drill pipe 1518 and down to the drill bit 1526. The drilling fluid can flow out from the drill bit 1526 and be returned to the surface 1504 through an annular area 1540 between the drill pipe 1518 and the sides of the borehole 1412. The drilling fluid may then be returned to the mud pit 1534, where such fluid is filtered. In some embodiments, the drilling fluid can be used to cool the drill bit 1526, as well as to provide lubrication for the drill bit 1526 during drilling operations. Additionally, the drilling fluid may be used to remove subsurface formation cuttings created by operating the drill bit 1526.

The workstation 1454 and the controller 1496 may include modules comprising hardware circuitry, a processor, and/or memory circuits that may store software program modules and objects, and/or firmware, and combinations thereof. The workstation 1454 and controller 1496 may be configured to control the direction and depth of the drilling in order to geosteer the drilling as discussed previously. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

Additional embodiments may include:

Embodiment 1: A method for optimizing production in a well, the method comprising: localizing low resistivity fluid deposits in a geological formation based on calculation of a difference between two electric current values, where each of the two electric current values correspond to different depths in the well; and optimizing production from the geological formation based on the localizing by adjustment of at least one of a drilling parameter or a production parameter.

Embodiment 2: The method of Embodiment 1, wherein localizing comprises electromagnetic tomography using a transmitter on a surface of the geological formation and a receiver in a borehole through the geological formation.

Embodiment 3. The method of Embodiments 1 or 2, wherein localizing comprises electromagnetic tomography using a transmitter in a borehole through the geological formation and a receiver on a surface of the geological formation.

Embodiment 4: The method of any one Embodiments 1-3, wherein localizing comprises electromagnetic tomography using a transmitter and receiver on a surface of the geological formation.

Embodiment 5: The method of any one Embodiments 1-4, wherein localizing comprises using an azimuthal resistivity tool.

Embodiment 6: The method of any one Embodiments 1-5, wherein using the azimuthal resistivity tool comprises measuring a current leakage from a casing through the geological formation.

Embodiment 7: The method of any one Embodiments 1-6, wherein the casing is a production well casing and measuring the current leakage comprises: injecting a current on the production well casing; and measuring a magnetic field within an injector well.

Embodiment 8: The method of any one Embodiments 1-7, wherein the casing is a production well casing and measuring the current leakage comprises: injecting a current on the production casing; and measuring a magnetic field within the production casing on which the current is injected.

Embodiment 9: The method of any one Embodiments 1-8, wherein measuring the current leakage comprises: measuring a magnetic field from magnetic sensors located outside of well casing.

Embodiment 10: The method of any one Embodiments 1-9, wherein optimizing production comprises geosteering a drill head.

Embodiment 11: The method of any one Embodiments 1-10, wherein optimizing production comprises adjusting apertures in at least one of a casing and a liner of a production well.

Embodiment 12: The method of any one Embodiments 1-11, wherein adjusting the apertures in the at least one of the casing and the liner comprises at least one of: adjusting an aperture design based on the low resistivity fluid deposits, adjusting an aperture density based on the low resistivity fluid deposits, and adjusting an aperture size based on the low resistivity fluid deposits.

Embodiment 13: The method of any one Embodiments 1-12, wherein optimizing production comprises estimating at least one of steam characteristics and production characteristics of the low resistivity fluid deposits.

Embodiment 14: The method of any one Embodiments 1-13, wherein the current is a first current, and wherein localizing low resistivity fluid deposits comprises, injecting a second current on a production well casing; detecting a third current on an injector well casing; and calculating the first current, wherein the first current is associated with the production well casing.

Embodiment 15: The method of any one Embodiments 1-14, wherein optimizing production comprises steering drilling of the well away from the low resistivity fluid deposits.

Embodiment 16: The method of any one Embodiments 1-15, wherein optimizing production comprises positioning at least one of a casing and a liner in the well having at least one of apertures of less density and narrower apertures near the low resistivity fluid deposits and positioning at least one of a casing and a liner in the well having at least one of apertures of greater density and wider apertures away from the low resistivity fluid deposits.

Embodiment 17: A method for optimizing production in a well, the method comprising: drilling a production or an injector well in a geological formation; localizing, with the production or injector well, low resistivity fluid deposits in the geological formation based on calculation of a difference between two electric current values, where each of the two electric current values correspond to different depths in the production or injector well by: electromagnetic tomography, current leakage measurement, or logging while drilling deep-reading to map low resistivity fluid deposits in the geological formation; and geosteering drilling, adjusting at least one of casing parameters and liner parameters, or estimating steam characteristics based on the localizing.

Embodiment 18: The method of Embodiment 17, wherein the geosteering drilling comprises geosteering a drill bit in the production well in three dimensions through the geological formation.

Embodiment 19: The method of any one Embodiments 17 or 18, wherein localizing low resistivity fluid deposits in the geological formation comprises using a logging while drilling tool.

Embodiment 20: The method of any one Embodiments 17-19, wherein the current is a first current, and wherein localizing low resistivity fluid deposits comprises, injecting a second current on a production well casing; detecting a third current on an injector well casing; and calculating the first current, wherein the first current is associated with the production well casing.

Embodiment 21: The method of any one Embodiments 17-20, wherein geosteering drilling comprises steering drilling of the well away from the low resistivity fluid deposits.

Embodiment 22: The method of any one Embodiments 17-21, wherein adjusting the at least one of casing parameters and liner parameters comprises positioning at least one of a casing and a liner in the well having at least one of apertures of less density and narrower apertures near the low resistivity fluid deposits and positioning at least one of a casing and a liner in the well having at least one of apertures of greater density and wider apertures away from the low resistivity fluid deposits.

Embodiment 23: A system comprising: a down hole tool comprising an electromagnetic tomography tool, a current leakage measurement tool, or a logging while drilling deep-reading tool configured to map low resistivity fluid deposits in a geological formation based on calculation of a difference between two electric current values, where each of the two electric current values correspond to different depths in a well; and a controller coupled to the down hole tool and configured to control optimization of production by controlling a drilling parameter or a production parameter based on the mapping of the low resistivity fluid deposits.

Embodiment 24: The system of claim 23, wherein the down hole tool comprises a logging while drilling tool having a non-azimuthal, azimuthal, deep-reading, or ultra-deep reading function.

Embodiment 25: The system of Embodiments 23 or 24, wherein the controller is further configured to control geosteering of a drill string based on the mapping of the low resistivity fluid deposits.

Embodiment 26: The system of any one Embodiments 23-25, further comprising at least one of a well casing and a liner in an injector well wherein at least one of the well casing and the liner comprises an aperture design in response to the mapping of the low resistivity fluid deposits.

Embodiment 27: The system of any one Embodiments 23-26, wherein the aperture design includes at least one of density, locations of the apertures of the at least one of the well casing and the liner.

Embodiment 28: The system of any one Embodiments 23-27, wherein the controller is further configured to steer a steam chamber away from the low resistivity fluid deposits.

Embodiment 29: The system of any one Embodiments 23-28, wherein the current is a first current, and wherein localizing low resistivity fluid deposits comprises, injecting a second current on a production well casing; detecting a third current on an injector well casing; and calculating the first current, wherein the first current is associated with the production well casing.

Embodiment 30: The system of any one Embodiments 23-29, further comprising at least one of a casing and a liner in the well having at least one of apertures of less density and narrower apertures near the low resistivity fluid deposits and at least one of a casing and a liner in the well having at least one of apertures of greater density and wider apertures away from the low resistivity fluid deposits.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for optimizing production in a well, the method comprising:
   localizing low resistivity fluid deposits in a geological formation based on calculation of a difference between two electric current values, where each of the two electric current values correspond to different depths in the well; and
   optimizing production from the geological formation based on the localizing by adjustment of at least one of a drilling parameter or a production parameter.

2. The method of claim 1, wherein localizing comprises electromagnetic tomography using a transmitter on a surface of the geological formation and a receiver in a borehole through the geological formation.

3. The method of claim 1, wherein localizing comprises electromagnetic tomography using a transmitter in a borehole through the geological formation and a receiver on a surface of the geological formation.

4. The method of claim 1, wherein localizing comprises electromagnetic tomography using a transmitter and receiver on a surface of the geological formation.

5. The method of claim 1, wherein localizing comprises using an azimuthal resistivity tool.

6. The method of claim 5, wherein using the azimuthal resistivity tool comprises measuring a current leakage from a casing through the geological formation.

7. The method of claim 6, wherein the casing is a production well casing and measuring the current leakage comprises:
   injecting a current on the production well casing; and
   measuring a magnetic field within an injector well.

8. The method of claim 6, wherein the casing is a production well casing and measuring the current leakage comprises:
   injecting a current on the production casing; and
   measuring a magnetic field within the production casing on which the current is injected.

9. The method of claim 6, wherein measuring the current leakage comprises:
   measuring a magnetic field from magnetic sensors located outside of well casing.

10. The method of claim 1, wherein optimizing production comprises geosteering a drill head.

11. The method of claim 1, wherein optimizing production comprises adjusting apertures in at least one of a casing and a liner of a production well.

12. The method of claim 11, wherein adjusting the apertures in the at least one of the casing and the liner comprises at least one of: adjusting an aperture design based on the low resistivity fluid deposits, adjusting an aperture density based on the low resistivity fluid deposits, and adjusting an aperture size based on the low resistivity fluid deposits.

13. The method of claim 1, wherein optimizing production comprises estimating at least one of steam characteristics and production characteristics of the low resistivity fluid deposits.

14. The method of claim 1,
   wherein the current is a first current, and
   wherein localizing low resistivity fluid deposits comprises,
      injecting a second current on a production well casing;
      detecting a third current on an injector well casing; and
      calculating the first current, wherein the first current is associated with the production well casing.

15. The method of claim 1, wherein optimizing production comprises steering drilling of the well away from the low resistivity fluid deposits.

16. The method of claim 1, wherein optimizing production comprises positioning at least one of a casing and a liner in the well having at least one of apertures of less density and narrower apertures near the low resistivity fluid deposits and positioning at least one of a casing and a liner in the well having at least one of apertures of greater density and wider apertures away from the low resistivity fluid deposits.

17. A method for optimizing production in a well, the method comprising:
   drilling a production or an injector well in a geological formation;
   localizing, with the production or injector well, low resistivity fluid deposits in the geological formation based on calculation of a difference between two electric current values, where each of the two electric current values correspond to different depths in the production or injector well by: electromagnetic tomography, current leakage measurement, or logging while drilling deep-reading to map low resistivity fluid deposits in the geological formation; and
   geosteering drilling, adjusting at least one of casing parameters and liner parameters, or estimating steam characteristics based on the localizing.

18. The method of claim 17, wherein the geosteering drilling comprises geosteering a drill bit in the production well in three dimensions through the geological formation.

19. The method of claim 17, wherein localizing low resistivity fluid deposits in the geological formation comprises using a logging while drilling tool.

20. The method of claim 17,
   wherein the current is a first current, and
   wherein localizing low resistivity fluid deposits comprises,
      injecting a second current on a production well casing;
      detecting a third current on an injector well casing; and calculating the first current, wherein the first current is associated with the production well casing.

21. The method of claim 17, wherein geosteering drilling comprises steering drilling of the well away from the low resistivity fluid deposits.

22. The method of claim 17, wherein adjusting the at least one of casing parameters and liner parameters comprises positioning at least one of a casing and a liner in the well having at least one of apertures of less density and narrower apertures near the low resistivity fluid deposits and positioning at least one of a casing and a liner in the well having at least one of apertures of greater density and wider apertures away from the low resistivity fluid deposits.

23. A system comprising:
a down hole tool comprising an electromagnetic tomography tool, a current leakage measurement tool, or a logging while drilling deep-reading tool configured to map low resistivity fluid deposits in a geological formation based on calculation of a difference between two electric current values, where each of the two electric current values correspond to different depths in a well; and
a controller coupled to the down hole tool and configured to control optimization of production by controlling a drilling parameter or a production parameter based on the mapping of the low resistivity fluid deposits.

24. The system of claim 23, wherein the down hole tool comprises a logging while drilling tool having a non-azimuthal, azimuthal, deep-reading, or ultra-deep reading function.

25. The system of claim 23, wherein the controller is further configured to control geosteering of a drill string based on the mapping of the low resistivity fluid deposits.

26. The system of claim 23, further comprising at least one of a well casing and a liner in an injector well wherein at least one of the well casing and the liner comprises an aperture design in response to the mapping of the low resistivity fluid deposits.

27. The system of claim 26, wherein the aperture design includes at least one of density, locations of the apertures of the at least one of the well casing and the liner.

28. The system of claim 23, wherein the controller is further configured to steer a steam chamber away from the low resistivity fluid deposits.

29. The system of claim 23,
wherein the current is a first current, and
wherein localizing low resistivity fluid deposits comprises,
injecting a second current on a production well casing;
detecting a third current on an injector well casing; and
calculating the first current, wherein the first current is associated with the production well casing.

30. The system of claim 23, further comprising at least one of a casing and a liner in the well having at least one of apertures of less density and narrower apertures near the low resistivity fluid deposits and at least one of a casing and a liner in the well having at least one of apertures of greater density and wider apertures away from the low resistivity fluid deposits.

* * * * *